W. S. O'CONNOR.
SECONDARY OR STORAGE BATTERY.
APPLICATION FILED APR. 29, 1911. RENEWED MAY 15, 1915.

1,164,746.                                    Patented Dec. 21, 1915.

Witnesses:
Edward Rowland
M. F. Keating

Inventor
William Scott O'Connor
By Attorney
Charles J. Kimener

UNITED STATES PATENT OFFICE.

WILLIAM SCOTT O'CONNOR, OF NEW YORK, N. Y.

SECONDARY OR STORAGE BATTERY.

1,164,746.  Specification of Letters Patent.  Patented Dec. 21, 1915.

Application filed April 29, 1911, Serial No. 624,205. Renewed May 15, 1915. Serial No. 28,478.

*To all whom it may concern:*

Be it known that I, WILLIAM SCOTT O'CONNOR, a citizen of the United States, and resident of New York, borough of Manhattan, county and State of New York, have made a new and useful Invention in Secondary or Storage Batteries, of which the following is a specification.

My invention is directed particularly to improvements in storage batteries of the Faure or Brush type and it has for its objects—First, to generally increase the efficiency of such batteries. Second, to afford at all times as free a circulation of the electrolyte as possible through all parts of the battery when the elements thereof are assembled and ready for commercial use. Third, to afford a free release of all generated gases.

To this end my invention is directed generically to the ventilation of the plates and the insulating media which separates the same so that the freest circulation of the electrolyte is effected transversely through the plates and laterally between the same, and also that in the event of the release of any of the active material it is permitted to descend by action of gravitation to the bottom of the containing vessel.

Figure 1:
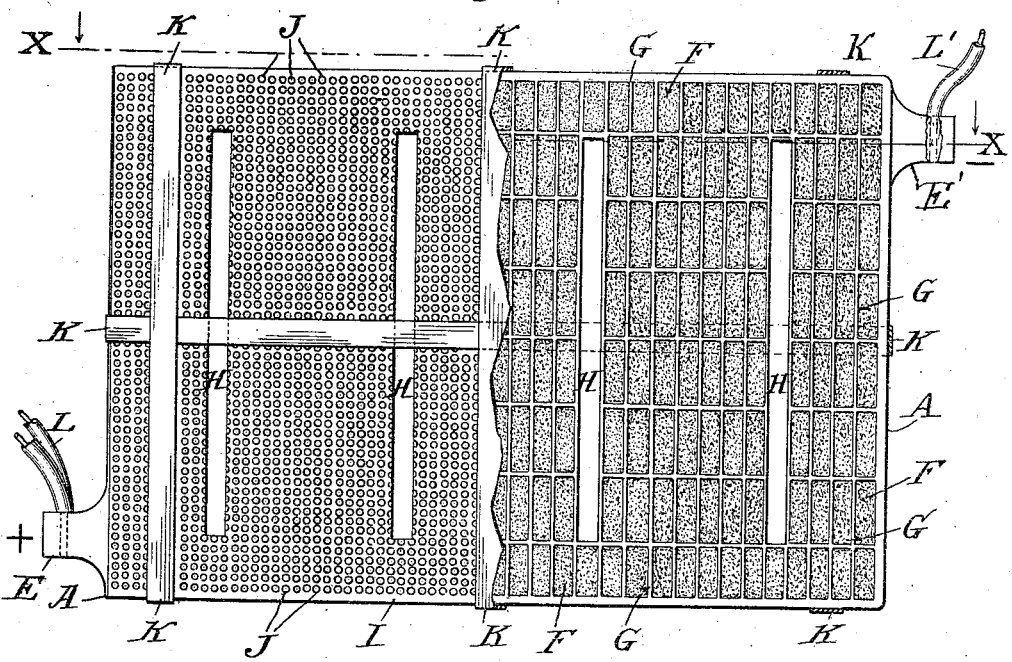
Figure 2:
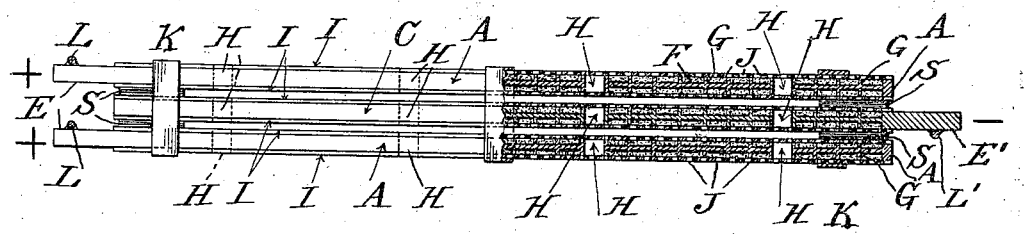

My invention will be fully understood by referring to the accompanying drawings, in which, Figure 1 is a side elevational view of a storage battery of the well known Faure or Brush type and embodying my improvement, the perforated insulating plate which protects or retains the active material on the outer faces of the grids being broken away on the right in order to enable one to better understand the details of construction. Fig. 2 is a part plan, part sectional view, as seen looking at Fig. 1 from the top toward the bottom of the drawings, the section being taken on the broken line X—X.

I have ascertained that in storage batteries it is very important that there should be as much ventilation as possible in all directions, both between the plates and through the plates and the insulating media which separates the same, in order not only that the electrolyte may have an absolutely free circulation through the plates themselves when amassed, but between the same, and also that all the generated gases may readily escape in all directions, thereby greatly decreasing the resistance of the complete cell.

Referring now to the drawings in detail, I will describe my improvement as shown, particularly in connection with a cell of the Brush type, in which I have illustrated two anode or electrode plates A, A, assembled with one cathode or electrode plate C, the latter located between the former and the anode plates provided with the usual integral lead lugs or ears E, E, the cathode plate having a like lug or ear E¹. In all of these plates there are shown the usual grids G, G on both faces thereof and the same are packed or filled with active material F, as clearly shown. The lugs or ears E for the anode plates are preferably located at the bottom of the cell, while the corresponding lug or ear E¹ for the cathode plate is located at the top thereof and said ears or lugs connected respectively with the lead wires or conductors L, L¹, the conductors L being insulated to the full depth of the electrolyte when placed in the cell. My improvement is illustrated as applied to this type of storage battery plates and embraces preferably a series of vertically disposed slots or openings H, H, H, H, which assume in each plate the proportions shown; that is to say, a height approximating the depth of the cell and a width the same as that of one set of grids in each plate.

My improvement embraces further a plurality of separating plates of insulating material I, I, such as hard rubber, celluloid, etc., which are located on the opposite faces of all of the plates and are provided each with corresponding slots or openings of the same length and width as the slots H, H in the plates, said slots calendering with the slots through the plates when the elements of the battery are assembled, as clearly shown. S, S, S, S represent four sets of triangular shaped blocks of laminated insulating material, preferably hard rubber, which are located between the four corners of adjoining plates, as clearly shown in Fig. 2, and are when assembled of such thickness respectively as to afford lateral ventilation in the nature of vertically disposed spaces between all of the plates. The insulating plates I, I, are also provided with relatively fine perforations J, J so as to afford free access of the electrolyte to the active material F in the grids G, and they may be secured to the plates by cement if preferred.

The parts are all assembled in the manner shown in the drawings and are then bound together in any preferred way. In the drawings I have illustrated the binding means as consisting of a plurality of soft rubber or other elastic bands K of insulating material which secure the parts in such relation to each other as to produce the best effect.

It will be noted, therefore, that when the parts are assembled in the manner shown in the drawings and placed in a cell with the necessary amount of electrolyte to effect the desired result the action of the battery is such that by reason of the vertical ventilating slots H, H and the corresponding ventilating slots in the insulating separators I, there will be afforded the freest possible circulation of the electrolyte therethrough in a transverse direction, and a corresponding free circulation of the electrolyte between the plates in a direction 90° from that of the circulation through the slots H, H, and that also there will, therefore, be afforded the freest possible elimination of the gases generated. I have ascertained that with a plate of this nature also there is little or no tendency to buckle and that even if any active material is released it is readily carried out either through the slots H, H or through the vertical slots at the sides and bottoms of the plates and between the same. The resistance is also materially decreased, as will be obvious, by reason of the great freedom with which the gases generated are released. The circulation of the electrolyte is also greatly increased by reason of such ventilation.

I do not limit my invention to the specific details of construction shown in the drawings, as obviously various means of transverse ventilation through storage battery plates might be effected, as by individual holes or openings of any desired contour or area, such matters falling fully within the skill of those versed in the art, the essence of my invention lying in the cross or transverse ventilation of storage battery plates when assembled, and also in the vertical ventilation thereof when combined with cross ventilating openings or slots. Nor do I limit myself to the use of my invention as applied especially to storage batteries of the Faure or Brush type, as obviously the same might be utilized in storage batteries of the Planté type or in fact in any storage battery of the plate type where the ampere capacity of the battery is made dependent upon the superficial area of the plate. In other words, my improvement has an especial utility in storage battery plates now known in the art as of the unifunctional type in contradistinction to those batteries known as of the bifunctional type, such, for instance, as disclosed in a number of U. S. patents granted to Alfred O. Tate, and as illustrated particularly in U. S. Patent 926,710 of June 29th, 1910. Nor do I limit the insulating media to perforated plates, as obviously plates of any porous substance having insulating qualities may be utilized, such as kaolin or the like.

Having thus described my invention what I claim and desire to secure by Letters Patent of the United States is—

1. A storage battery embracing intervening anodes and cathodes of grid-like form having a series of vertical slots which calender with each other in all of the grids, and a series of perforated insulating separators in combination with insulating means between the corners of adjoining grids whereby perfect ventilation is maintained through the battery, substantially as described.

2. A storage battery embracing intervening anodes and cathodes of grid-like form having a series of vertical slots which calender with each other in all of the grids, and a series of perforated insulating separators; in combination with triangular-shaped blocks of laminated insulating material located between the four corners of the several electrodes, substantially as described.

3. A storage battery consisting of a plurality of grids containing active material in their alternate surfaces, said grids having vertically disposed slots or openings located at equal distances apart and calendering with each other throughout the battery; in combination with perforated separating plates between the anodes and cathodes together with insulating means between the corners of adjoining grids and flexible binding means for holding the several parts of the battery together, substantially as described.

4. In a storage battery anode plates consisting of grids with active material applied on opposite sides, and cathode plates similarly constructed; all of said plates having vertically disposed calendering slots approximating the height of the plates; together with perforated separating plates located between said grids and triangular-shaped blocks located between the corners of the respective grids at the top and bottom, whereby both lateral and vertical ventilation is effected; in combination with binding bands for holding the grids in operative relation, substantially as described.

In testimony whereof I have signed my name to this specification in the presence of two subscribing witnesses.

WILLIAM SCOTT O'CONNOR.

Witnesses:
C. J. KINTNER,
M. F. KEATING.

Copies of this patent may be obtained for five cents each, by addressing the "Commissioner of Patents, Washington, D. C."